(12) United States Patent
Roetzer et al.

(10) Patent No.: US 11,283,378 B2
(45) Date of Patent: Mar. 22, 2022

(54) METHOD FOR DETERMINING PHASE CURRENTS OF A ROTATING MULTIPHASE ELECTRICAL MACHINE FED BY MEANS OF A PWM-CONTROLLED INVERTER

(71) Applicant: Robert Bosch GmbH, Stuttgart (DE)

(72) Inventors: Marco Roetzer, Epfendorf (DE); Ulrich Vollmer, Weilheim (DE); Michael Bendel, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 16/613,903

(22) PCT Filed: Apr. 18, 2018

(86) PCT No.: PCT/EP2018/059865
§ 371 (c)(1),
(2) Date: Nov. 15, 2019

(87) PCT Pub. No.: WO2018/228741
PCT Pub. Date: Dec. 20, 2018

(65) Prior Publication Data
US 2021/0408948 A1  Dec. 30, 2021

(30) Foreign Application Priority Data
Jun. 14, 2017  (DE) ............... 10 2017 210 071.0

(51) Int. Cl.
*H02P 23/00* (2016.01)
*H02P 6/18* (2016.01)
(Continued)

(52) U.S. Cl.
CPC ............ *H02P 6/183* (2013.01); *H02P 25/026* (2013.01); *H02P 27/08* (2013.01)

(58) Field of Classification Search
CPC ........ H02P 25/026; H02P 27/08; H02P 6/183; H02P 6/28; H02P 21/00; H02P 21/24
See application file for complete search history.

(56) References Cited

U.S. PATENT DOCUMENTS

2007/0132415 A1  6/2007  Patel et al.

FOREIGN PATENT DOCUMENTS

KR    100839074 B1 *  6/2008
WO   2012/004343 A1    1/2012

OTHER PUBLICATIONS

International Search Report corresponding to PCT Application No. PCT/EP2018/059865, dated Jul. 24, 2018 (German and English language document) (5 pages).
(Continued)

*Primary Examiner* — Karen Masih
(74) *Attorney, Agent, or Firm* — Maginot, Moore & Beck LLP

(57) ABSTRACT

The disclosure relates to a method for determining phase currents of a rotating multiphase electrical machine fed by means of a PWM-controlled inverter. In this case, injection voltages applied in at least one stipulated PWM period are determined. An evaluation direction for a phase current vector is also determined and a division of current measurements for the individual phase currents is determined on the basis of the evaluation direction. The phase currents are then determined on the basis of the previously determined division of the current measurements.

9 Claims, 3 Drawing Sheets

(51) Int. Cl.
*H02P 27/08* (2006.01)
*H02P 25/026* (2016.01)

(56) References Cited

OTHER PUBLICATIONS

Landsmann, P. et al., "Silent Injection for Saliency based Sensorless Control by means of Current Oversampling," 2013 IEEE International Conference on Industrial Technology (ICIT), IEEE, pp. 398-403, 2013 (6 pages).
Kim, S. et al., "PWM Switching Frequency Signal Injection Sensorless Method in IPMSM," IEEE Transactions on Industry Applications, vol. 48, No. 5, pp. 1576-1587, 2012 (12 pages).
Weber, B. et al., "Increased Signal-to-Noise Ratio of Sensorless Control Using Current Oversampling," 9th International Conference on Power Electronics-ECCE Asia, Jun. 2015, pp. 1129-1134 (6 pages).

\* cited by examiner

METHOD FOR DETERMINING PHASE CURRENTS OF A ROTATING MULTIPHASE ELECTRICAL MACHINE FED BY MEANS OF A PWM-CONTROLLED INVERTER

This application is a 35 U.S.C. § 371 National Stage Application of PCT/EP2018/059865, filed on Apr. 18, 2018, which claims the benefit of priority to Serial No. DE 10 2017 210 071.0, filed on Jun. 14, 2017 in Germany, the disclosures of which are incorporated herein by reference in their entirety.

BACKGROUND

The disclosure relates to a method for determining phase currents of a rotating multiphase electrical machine fed by means of a PWM-controlled inverter.

Such a method is disclosed, for example, in the scientific article by P. Landsmann et al. ["Silent injection for saliency based sensorless control by means of current oversampling", Industrial Technology (ICIT) 2013 IEEE International Conference, pp. 398-403]. A transducerless regulation is indicated there that attempts to determine the rotor position of the electrical machine without using a position sensor, in that the phase currents of the electrical machine are determined. At low rotation speeds, what is called an anisotropy-based method is used here, which determines the rotor position by means of the magnetic anisotropy of the machine.

An inverter with pulse width modulation (PWM) is usually employed in highly dynamic drives to generate the adjustable phase voltage of the electrical machines. The control signals of the inverter are calculated with the aid of a space vector modulation that converts the voltage vector to be applied, which has been determined by a controller, into PWM duty cycles. In common anisotropy-based methods, such as is for example disclosed in the scientific article by S. Kim [PWM Switching Frequency Signal Injection Sensorless Method in IPMSM, 2012, IEEE Transactions on Industry Applications], a position-dependent current change is produced through the deliberate modification of the voltage vector, and this is detected by current measurements at suitable points in time. The voltages required here to adjust the manipulated variables are, for example, overlaid with a high-frequency voltage. The high-frequency current changes generated by the high-frequency voltage contain corresponding rotor position information.

Depending on the current sensors used and the PWM drive used, the phase currents in each PWM period are recorded in one or in both passive switching states of the inverter, synchronously with the PWM. If the phase currents in only one of the two passive switching states can be measured, which is, for example, the case with a shunt-measurement in the low-side path of the inverter, then it is helpful to extend this one passive switching state as far as possible in time, in order to be able to carry out as many current measurements as possible. If, on the other hand, the phase currents can be measured in both passive switching states, then the two passive switching states should be set to have equal length.

The effect of disturbances can be reduced through oversampling the individual phase currents, and the signal-to-noise ratio of the phase currents correspondingly improved, as is, for example, indicated in the scientific article by P. Landsmann. Oversampling is to be understood here as referring to the fact that the phase currents are measured a plurality of times in sequence within one passive switching state of the inverter, and that the measured current values are then averaged in order to obtain a definitive value for the respective phase current.

The phase currents determined can subsequently be transformed into a two-dimensional replacement system which can be configured, for example, as a stator-referenced, rotor-flux-oriented or even an injection-voltage-oriented coordinate system. In order to separate the high-frequency current component from the fundamental wave current, a demodulation method can thereupon be performed. Depending on the high-frequency current component, the rotor position can, for example, be determined on that basis.

SUMMARY

The disclosure relates to a method for determining phase currents of a rotating multiphase electrical machine fed by means of a PWM-controlled inverter. The electrical machine can, for example, be a permanently excited synchronous machine. The method comprises the method steps of:

a. determining injection voltages at a time point during one controller sampling period that are applied for drive of the electrical machine in at least one PWM period following this time point, b. determining an evaluation direction of a phase current vector of the electrical machine depending on the injection voltages determined in step a and/or on an operating point of the electrical machine and/or on a temperature-dependency of the phase current vector, c. determining, for each of the phase currents of the electrical machine, a number of current measurements that should be carried out in each case in at least one passive switching state of the inverter within the at least one PWM period, depending on the evaluation direction determined in method step b, d. determining the phase currents that flow in the at least one PWM period of the electrical machine, depending on the respective number of current measurements determined in method step c.

It is advantageous here that the phase currents usually have a different information content. This information content is to be considered as dependent on direction in a two-dimensional coordinate system. The information content is found here in the high-frequency current change caused by the injection voltages, depending on which a conclusion can, for example, be drawn as to the rotor position of the electrical machine. The phase current vector correlates here, for example, to a rotor position error.

In that the number of current measurements for the individual phase currents is now determined in such a way that the evaluation direction is included in the determination of the distribution of the current measurements, the phase current can be measured most frequently with the maximum information content. As a result, the signal-to-noise ratio can in turn be improved for this phase current, and thus the information contained in this phase current determined with a small error.

The evaluation direction is here determined in such a way that it is in accord with the direction of the phase current that has the greatest information content. This is, for example, the phase current in the direction of which the high-frequency current change is most significant.

In the case of methods in which the magnet temperature is determined through determination of the saturation state of the electrical machine, the signal-to-noise ratio can also be improved, in that an evaluation direction is chosen in which the phase current vector exhibits the greatest possible temperature dependency.

The controller sampling point is to be understood here as referring to the period of time between two controller sampling steps that have the purpose of determining the injection voltages to be applied to the electrical machine. The injection voltages are determined by means of a controller. The injection voltages here are composed of voltages specified by the controller for drive of the electrical machine, which generate a corresponding fundamental wave current, together with additional, high-frequency voltages. The fundamental wave current here provides the desired operation of the machine with, for example, a predetermined rotation speed or with a predetermined torque. Through the high-frequency voltages, a position-dependent current change can for example, furthermore, be achieved, while conclusions can, for example, be drawn from this current change as to the rotor position of the electrical machine.

Since the current regulation that is used to adjust the fundamental wave current is less sensitive to noise than the estimation of the rotor position or temperature is, the adjustment of the number of current measurements for each phase current only leads to a negligibly small degeneration of this current control. The improved signal-to-noise ratio leads, moreover, in such anisotropy-based methods to a lower generation of noise.

The determination of the number of current measurements for each of the phase currents is carried out depending on a previously determined evaluation direction and using, for example, a general Clarke transformation. This has the result that the largest number of current measurements is determined for the phase current with the greatest information content.

Current measurement is to be understood to refer here to the fact that each phase current is recorded by means of at least one current sensor, and this current sensor is then sampled by at least one analog/digital converter (A/D converter) in order to obtain a current value for the respective phase current.

Usually it can be assumed here that each A/D converter can sample each current sensor.

Passive switching state of the inverter is to be understood to refer here to a state in which all the high-side transistors of the inverter all the low-side transistors of the inverter are conductive.

It is provided in one embodiment of the method according to the disclosure, that the number of current measurements that are determined in method step c for each phase current corresponds, for all the phase currents in total, to a maximum possible number of current measurements within the at least one passive switching state of the inverter.

It is advantageous here that the period of time for possible current measurements is extended as far as possible, in order in that way to further optimize the signal-to-noise ratio of the corresponding phase currents. The maximum possible number of current measurements within the at least one passive switching state depends here, amongst other things, on the duration of the passive switching state itself, but also on the duration of the sampling time of the A/D converter and their dead times.

According to one embodiment of the method according to the disclosure, it is provided that in method step d at least one of the phase currents is determined by means of a plurality of A/D converters.

It is advantageous here that altogether more current measurements can be carried out than with only one A/D converter, whereby the signal-to-noise ratio of the respective phase current can be further improved.

According to one embodiment of the method according to the disclosure, it is provided that the determination of the at least one phase current takes place in that the plurality of A/D converters sample the at least one phase current with a time offset with respect to one another.

It is advantageous here that disturbances that may be present in the current measurement are not recorded twice. A time offset is to be understood here such that the time points for the recording of the respective phase current by means of the plurality of A/D converters are not identical. An offset of the sampling time points of a fraction of a conversion time of the respective A/D converters is already sufficient here.

According to one embodiment of the method according to the disclosure, it is provided that in method step d the current measurements take place midway in the at least one passive switching state.

The midway point of the at least one passive switching state is to be understood here such that the measuring time points of the current measurements are carried out around the midway point of the duration of the passive switching state.

It is advantageous here that if the midway measuring time point lies midway in the passive switching state and thus at the PWM beginning or in the PWM center in the case of midway-centered PWM drive, the effect of the PWM drive on the measured phase currents can be neglected.

In one embodiment of the method according to the disclosure, it is provided that in method step d the current measurements of the respective phase currents take place with mirror symmetry with respect to one another.

It is advantageous here that it is assumed that in a passive switching state the phase currents decay almost linearly. As a result, through a mirror-symmetric sampling of the respective phase currents and subsequent averaging of the sampled current values, the phase currents that flow at the midway measuring time point are determined for all phases.

Mirror-symmetry is to be understood such that if, for example, a first and a second phase current should be measured, the first phase current is initially measured once, then the second phase current measured once, whereupon the first phase current is measured once again.

According to one embodiment of the method according to the disclosure, it is provided that zero is determined in method step c as the number of current measurements for the phase current that deviates most in terms of direction from the evaluation direction, wherein this phase current is determined in method step d depending on the other phase currents by means of Kirchoff's first law.

It is advantageous here that the phase current which deviates most in terms of direction from the evaluation direction also has the lowest information content. This phase current is then not measured at all, but is calculated from the other phase currents. As a result, more current measurements can be carried out for the other, more information-rich phase currents, whereby the signal-to-noise ratio for these phase currents can be further improved. The phase current which deviates most in terms of direction from the evaluation direction is defined in that the magnitude of the scalar product of a unit vector that points in the evaluation direction and a unit vector that points in the direction of the phase current is the smallest for this phase current. This illustrates how the direction of the phase current can be thought of as an "axis", and thus that the opposite direction of the phase current, that is, in terms of direction, the negative value of the phase current as it were, must also always be considered.

According to one embodiment of the method according to the disclosure, it is provided that, following method step d, a method step e and a method step f take place, wherein in method step e a Clarke transformation is determined depending on the number of current measurements determined in method step c for each phase current and/or depending on the evaluation direction determined in method step b, and wherein in method step f the phase current vector in the evaluation direction is determined depending on the Clarke transformation and on the phase currents determined in method step d whose number of current measurements is greater than zero.

It is advantageous here that the current components in the evaluation direction are calculated particularly efficiently, since the phase currents whose number of current measurements is equal to zero are not used in the calculation.

The disclosure also relates to an electrical machine, wherein the electrical machine is of rotating, multi-phase design, and is fed by means of a PWM-controlled inverter. The electrical machine is designed to carry out a method according to the disclosure.

DETAILED DESCRIPTION

Figure 1:
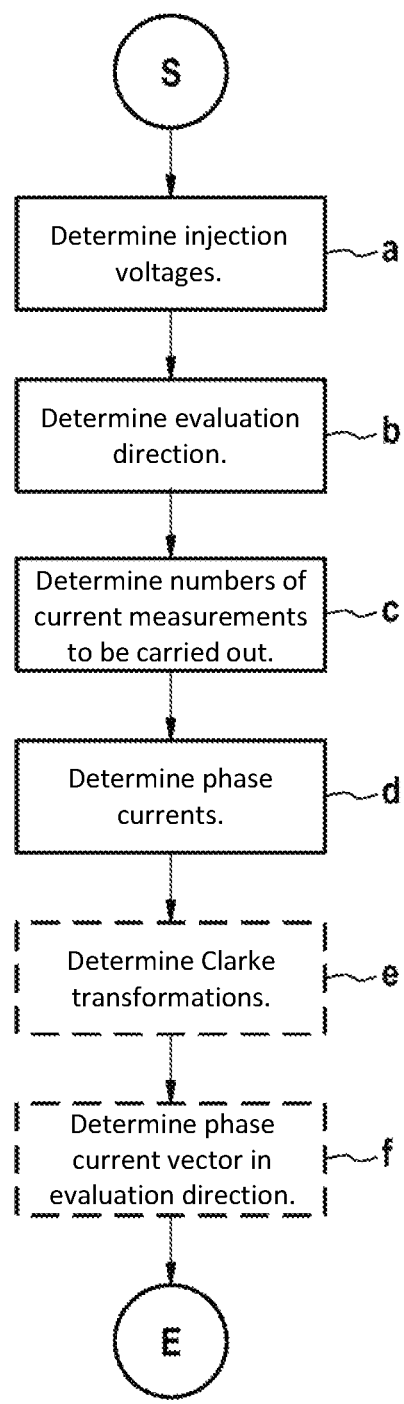
FIG. 1 shows an exemplary embodiment of a method according to the disclosure for determining phase currents of a rotating multiphase electrical machine fed by means of a PWM-controlled inverter.

FIG. 1 shows a first exemplary embodiment of a method according to the disclosure.

The phase currents $i_a$, $i_b$, $i_c$ of a three-phase rotating electrical machine fed by means of a PWM-controlled inverter are determined by means of the method. The rotor position of the electrical machine can, for example, be estimated on the basis of the determined phase currents $i_a$, $i_b$, $i_c$.

At the beginning, in a method step a, at a time point during a controller sampling period, injection voltages that will be applied in at least one PWM period following this time point for drive of the electrical machine are determined. The injection voltages are determined by means of a controller. The injection voltages are here composed of voltages specified by the controller for drive of the electrical machine, which generate a corresponding fundamental wave current together with additional, high-frequency voltages. The fundamental wave current here provides the desired operation of the machine with, for example, a predetermined rotation speed or also with a predetermined torque. Through the high-frequency voltages, a position-dependent current change can for example, furthermore, be achieved, while conclusions can, for example, be drawn from this current change as to the rotor position of the electrical machine.

In a method step b an evaluation direction can then be determined depending on the injection voltages determined in method step a. The evaluation direction is here, for example, oriented to the direction of the high-frequency voltage injection which is fed in in addition to the voltages required to adjust the manipulated variables. The reason for this is that the high-frequency current changes generated by the high-frequency voltage contain corresponding rotor position information, wherein the direction of the current change is correlated to the direction of the high-frequency voltage injection. If it is now, for example, assumed that the total rotor position information is contained in phase current $i_a$, the direction of the phase current $i_a$ is determined as the evaluation direction for the phase current vector.

After method step b, the number of current measurements that should be carried out for each of the three phase currents $i_a$, $i_b$, $i_c$ in at least one passive switching state of the inverter within the at least one PWM period is determined in a method step c. This is determined here depending on the evaluation direction determined in method step b. Since, in method step b, the evaluation direction is for example determined in the direction of the phase current $i_a$, the number of current measurements for the phase current $i_a$ is maximized in order to optimize the signal-to-noise ratio for the phase current $i_a$. The number of current measurements assigned to the phase current $i_b$ can, moreover, be merely one, and the number of current measurements can be simply zero for the phase current $i_c$. The maximum number of current measurements depends, for example, on the sampling time of the A/D converters and their dead time. Only a limited total number of current measurements can thus be carried out in each passive switching state, and these can then be appropriately distributed over the individual phase currents $i_a$, $i_b$, $i_c$.

The phase currents $i_a$, $i_b$, $i_c$ are then determined in a method step d, wherein this determination takes place depending on the number of current measurements respectively determined in method step c. The single current measurements of the phase current $i_b$ is necessary in order to be able to uniquely determine the phase current vector. As already explained, in this case no current measurement is necessary at all for the phase current $i_c$, since this can be determined, for example, from the phase current $i_a$ and the phase current $i_b$ by means of Kirchoff's first law as follows:

$$i_c = -i_a - i_b$$

Optionally, after method step d, a further method step e and a method step f can take place. In method step e a Clarke transformation is here determined for each of the phase currents depending on the number of current measurements determined in method step c or also depending on the evaluation direction determined in method step b.

In method step f, the phase current vector in the evaluation direction is subsequently determined depending on the Clarke transformation determined in method step f and on the phase currents whose number of current measurements is greater than zero determined in method step d.

In this example, the Clarke transformation used for evaluation is therefore only dependent on the phase currents $i_a$ and $i_b$.

Figure 2:
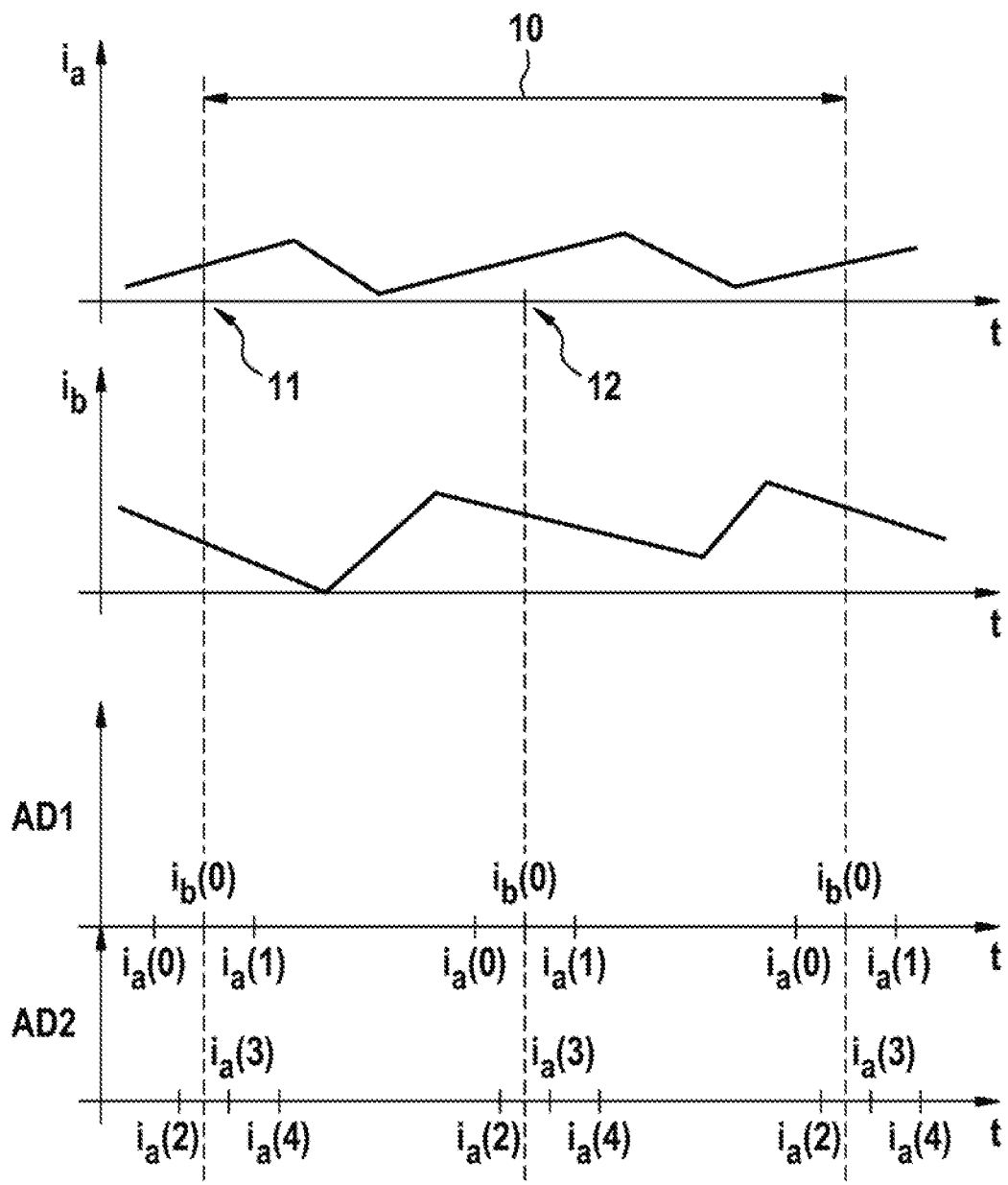
FIG. 2 shows an exemplary phase current-time diagram for the method illustrated in FIG. 1 and the time points of the current measurements of the respective phase currents carried out by means of the A/D converter.

FIG. 2 shows an exemplary phase current-time diagram for the method illustrated in FIG. 1 and the time points of the current measurements of the respective phase currents carried out by means of the A/D converters.

The curves of the phase currents $i_a$ and $i_b$ are plotted against time t. The duration of a PWM period 10 is also illustrated, wherein the PWM period 10 has a PWM start 11 and a PWM midway point 12.

The sampling behavior of a first A/D converter AD1 and a second A/D converter AD2 is also illustrated, wherein the first and second A/D converters AD1 and AD2 can sample respectively all the phase currents $i_a$, $i_b$ and $i_c$ by means of current sensors as required. The current measurements are carried out here both around the PWM start 11 and the PWM midway point 12.

As described in FIG. 1, the phase current $i_a$ should be measured as often as possible, since this has the greatest information content. For this reason, the phase current $i_a$ is measured twice and the phase current $i_b$ only once by means of the first A/D converter AD1 around the PWM start 11, so leading to the current values $i_a(0)$, $i_b(0)$ and $i_a(1)$. Only the phase current $i_a$ is, on the other hand, measured by the A/D converter AD2 around the PWM start 11, which accordingly leads to the current values $i_a(2)$, $i_a(3)$ and $i_a(4)$.

It is to be noted that the phase currents $i_a$ and $i_b$ are sampled by the first A/D converter AD1 with mirror symmetry with respect to one another. The two measurements of the phase current $i_a$ thus surround the measurement of the phase current $i_b$. In addition, the A/D converters AD1 and AD2 sample with a small mutual offset.

The distribution and performance of the current measurements by the A/D converters AD1 and AD2 are correspondingly repeated around the PWM midway point 12 and around the PWM start of the following PWM period.

In order then finally to determine the phase currents $i_a$, $i_b$ and $i_c$, the current values $i_a(0)$, $i_a(1)$, $i_a(2)$, $i_a(3)$ and $i_a(4)$ recorded for the phase current $i_a$ are averaged. The current value $i_b(0)$ recorded for the phase current $i_b$ is also used, and the phase current $i_c$ calculated by means of Kirchoff's first law from the averaged phase current $i_a$ and the phase current $i_b$.

Figure 3:
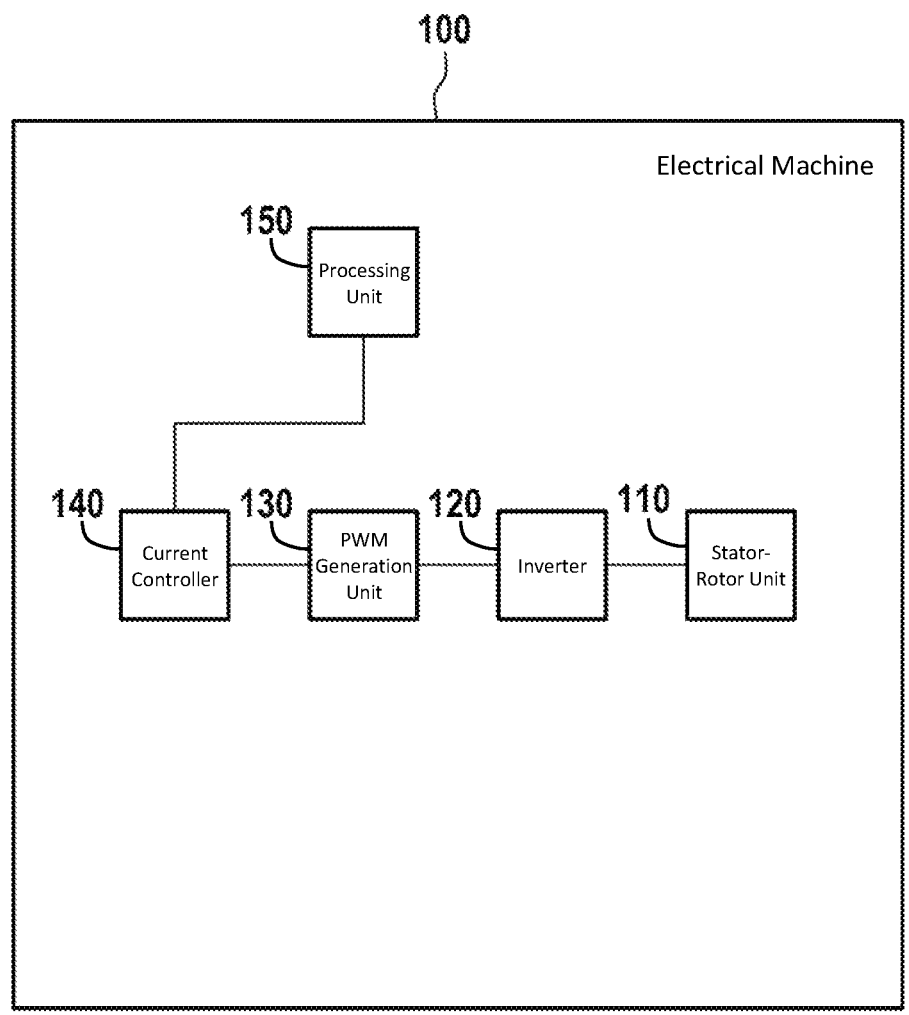
FIG. 3 shows an exemplary embodiment of a multiphase electrical machine that is designed to carry out a method according to the disclosure.

FIG. 3 shows an exemplary embodiment of a multiphase electrical machine (100) which is designed to carry out a method according to the disclosure.

The electrical machine 100 here has a stator-rotor unit 110. This stator-rotor unit 110 is fed by an inverter 120 which can, for example, be designed as a B6 bridge. The inverter 120 is in turn driven by a PWM generation unit 130 which converts the specifications received from a current controller 140 into corresponding PWM duty ratios. The current controller 140 is designed to sample the phase currents $i_a$, $i_b$ and $i_c$ of the stator-rotor unit 110 which is not, however, illustrated here. The electrical machine 100 can furthermore comprise a processing unit 150 that is designed to control the current control in such a way that the phase currents $i_a$, $i_b$ and $i_c$ are determined by means of the method according to the disclosure, for example according to FIG. 1.

The invention claimed is:

1. A method for determining phase currents of a rotating multiphase electrical machine fed by a PWM-controlled inverter, the method comprising:
   determining injection voltages at a time point during one controller sampling period that are applied to drive the rotating multiphase electrical machine in at least one PWM period following the time point;
   determining an evaluation direction of a phase current vector of the rotating multiphase electrical machine based at least one of (i) on the injection voltages, (ii) an operating point of the rotating multiphase electrical machine, and (iii) a temperature-dependency of the phase current vector;
   determining, for each of the phase currents, a number of current measurements to be carried out in each case in at least one passive switching state of the PWM-controlled inverter within the at least one PWM period, based on the evaluation direction; and
   determining the phase currents that flow during the at least one PWM period of the rotating multiphase electrical machine, based on the respective number of current measurements.

2. The method as claimed in claim 1, wherein the number of current measurements for each phase current corresponds, for all the phase currents in total, to a maximum possible number of current measurements within the at least one passive switching state of the PWM-controlled inverter.

3. The method as claimed in claim 1, the determining the phase currents further comprising:
   determining at least one of the phase currents using a plurality of A/D converters.

4. The method as claimed in claim 3, the determining the phase currents further comprising:
   sampling, with the plurality of A/D converters, the at least one phase current with a time offset with respect to one another.

5. The method as claimed in claim 1, the determining the phase currents further comprising:
   determining the phase currents based on current measurements of the respective number of current measurements that take place midway in the at least one passive switching state.

6. The method as claimed in claim 1, the determining the phase currents further comprising:
   determining the phase currents based on current measurements of the respective number of current measurements that take place with mirror symmetry with respect to one another.

7. The method as claimed in claim 1, wherein:
   the determining, for each of the phase currents, the number of current measurements includes determining as zero the number of current measurements for a first phase current of the phase currents that deviates most in terms of direction from the evaluation direction; and
   the determining the phase currents includes determining the first phase current based on others of the phase currents using Kirchoff's first law.

8. The method as claimed in claim 1, further comprising:
   determining a Clarke transformation based on at least one of (i) the number of current measurements for each of the phase currents and (ii) the evaluation direction; and
   determining the phase current vector in the evaluation direction based on the Clarke transformation and those of the phase currents whose number of current measurements is greater than zero.

9. An electrical machine comprising:
   a rotating multiphase electrical motor having a stator and a rotor;
   a PWM-controlled inverter; and
   a processor configured to:
      determine injection voltages at a time point during one controller sampling period that are applied to drive the rotating multiphase electrical motor in at least one PWM period following the time point;
      determine an evaluation direction of a phase current vector of the rotating multiphase electrical motor based at least one of (i) on the injection voltages, (ii) an operating point of the rotating multiphase electrical motor, and (iii) a temperature-dependency of the phase current vector;
      determine, for each of the phase currents, a number of current measurements to be carried out in each case in at least one passive switching state of the PWM-controlled inverter within the at least one PWM period, based on the evaluation direction; and determine the phase currents that flow during the at least one PWM period of the rotating multiphase electrical motor, based on the respective number of current measurements.

\* \* \* \* \*